US010383319B2

(12) United States Patent
Nakahata et al.

(10) Patent No.: US 10,383,319 B2
(45) Date of Patent: Aug. 20, 2019

(54) CASTING ROD AND METHOD OF FABRICATING TIP ROD OF CASTING ROD

(71) Applicant: Globeride, Inc., Tokyo (JP)

(72) Inventors: Yoshinori Nakahata, Tokyo (JP); Takuji Kawamura, Tokyo (JP); Takashi Watanabe, Tokyo (JP)

(73) Assignee: GLOBERIDE, INC., Tokyo (JP)

(*) Notice: Subject to any disclaimer, the term of this patent is extended or adjusted under 35 U.S.C. 154(b) by 0 days.

(21) Appl. No.: 14/620,370

(22) Filed: Feb. 12, 2015

(65) Prior Publication Data

US 2015/0272098 A1 Oct. 1, 2015

(30) Foreign Application Priority Data

Mar. 26, 2014 (JP) ................................ 2014-063124
Nov. 28, 2014 (JP) ................................ 2014-241607

(51) Int. Cl.

| | |
|---|---|
| ***A01K 87/04*** | (2006.01) |
| ***A01K 87/00*** | (2006.01) |
| *B29C 70/30* | (2006.01) |
| *B29K 101/10* | (2006.01) |
| *B29K 105/08* | (2006.01) |
| *B29K 309/08* | (2006.01) |

(Continued)

(52) U.S. Cl.

CPC .............. *A01K 87/04* (2013.01); *A01K 87/00* (2013.01); *B29C 70/30* (2013.01); *B29C 70/32* (2013.01); *B29C 70/86* (2013.01); *B29K 2101/10* (2013.01); *B29K 2105/0872* (2013.01); *B29K 2309/08* (2013.01); *B29K 2705/00* (2013.01); *B29L 2023/00* (2013.01); *B29L 2031/06* (2013.01)

(58) Field of Classification Search

CPC ................................ A01K 87/04; A01K 87/00
See application file for complete search history.

(56) References Cited

U.S. PATENT DOCUMENTS 6,148,558 A * 11/2000 Ono ...................... A01K 87/00 43/18.1 R
6,709,347 B1 * 3/2004 Ono ...................... A01K 87/00 280/819

(Continued)

FOREIGN PATENT DOCUMENTS

JP 08-294344 11/1996
JP H11-103727 4/1999

(Continued)

OTHER PUBLICATIONS

Extended European Search Report dated Jan. 20, 2016 for Appln. No. 15154596.9.

(Continued)

*Primary Examiner* — Jessica B Wong
(74) *Attorney, Agent, or Firm* — Pillsbury Winthrop Shaw Pittman, LLP

(57) ABSTRACT

One object is to provide a casting rod wherein a tip rod vibrates for a long period of time upon a fish bite. In accordance with one aspect, the casting rod of the present invention includes a tip rod formed of a fiber reinforced resin material into a tubular shape; and a distal end region of the tip rod is provided with a high specific gravity member having a specific gravity three to six times as high as a material constituting the tip rod.

15 Claims, 7 Drawing Sheets

(51) Int. Cl.

| | |
|---|---|
| *B29L 23/00* | (2006.01) |
| *B29L 31/06* | (2006.01) |
| *B29C 70/32* | (2006.01) |
| *B29C 70/86* | (2006.01) |
| *B29K 705/00* | (2006.01) |

(56) References Cited

U.S. PATENT DOCUMENTS

| | | | | |
|---|---|---|---|---|
| 2003/0188471 | A1* | 10/2003 | Ahn | A01K 87/00 43/18.1 R |
| 2005/0178040 | A1 | 8/2005 | Kato et al. | |

FOREIGN PATENT DOCUMENTS

| | | | |
|---|---|---|---|
| JP | 2005-278551 | | 10/2005 |
| JP | 2007-289067 | A | 11/2007 |
| JP | 2007-289103 | | 11/2007 |
| JP | 4328656 | | 9/2009 |
| KR | 10-2006-0056217 | A | 5/2006 |

OTHER PUBLICATIONS

Partial European Search Report dated Sep. 25, 2015 for European Appln. No. 15154596.9.

Chinese Office Action dated Nov. 14, 2016 for Appln. No. 201510106349.8.

Non-Final Office Action Korean Patent Application No. 10-2015-0032930 dated Jul. 17, 2017 with English translation.

Second Office Action Chinese Patent Application No. 201510106349.8 dated Mar. 30, 2017 with English translation.

Third Office Action Chinese Patent Application No. 201510106349.8 dated Jun. 19, 2017 with English translation.

Office Action dated Jan. 29, 2018 in Korean Patent Application No. 10-2015-0032930 dated Jan. 29, 2018 with English translation.

Notification of Reasons for Refusal Japanese Patent Application No. 2014-241607 dated Apr. 26, 2018 with English translation.

Communication under Rule 71(3) EPC—EP Application No. 15154596.9 dated May 7, 2018.

* cited by examiner

CASTING ROD AND METHOD OF FABRICATING TIP ROD OF CASTING ROD

CROSS-REFERENCE TO RELATED APPLICATIONS

This application is based on and claims the benefit of priority from Japanese Patent Application Serial Nos. 2014-063124 (filed on Mar. 26, 2014) and 2014-241607 (filed on Nov. 28, 2014), the contents of which are hereby incorporated by reference in their entirety.

TECHNICAL FIELD

The present invention relates to a casting rod used for casting a tackle for a long distance for fishing and a method of fabricating a tip rod of the casting rod.

BACKGROUND

Typically, a casting rod is used for casting a tackle for a long distance particularly from a beach or a riverside. There is known a casting rod used for such a fishing style including guides of a fishing line arranged so as to enable casting a tackle as far as possible and sensing a fish bite satisfactorily (see Japanese Patent Application Publication No. H8-294344). In fishing with a casting rod, an angler casts a tackle and keeps the rod on a rod holder with the fishing line under a tension. Upon visually finding vibration of a tip rod caused by a fish bite, the angler winds up the tackle.

For sensing a fish bite visually through vibration of a tip rod while keeping the casting rod on a rod holder, the tip rod should preferably have a structure with as small a vibration damping factor as possible (vibrating for a long time). That is, if the tip rod vibrates for a long time, an angler who sometimes looks away from the tip rod would not overlook a fish bite and miss a catch. In particular, when a plurality of casting rods are put up in a row, it is difficult to watch the tip rods of all the casting rods constantly. Therefore, the tip rods should preferably vibrate for a long time upon a fish bite for better visual sensing. Further, when an angler manually holds a casting rod, a fish bite can be sensed through vibration transmitting from the rod tip to the butt end. The tip rod should preferably vibrate for a long time even upon a slight fish bite.

A tip rod of publicly known casting rods as described above is formed of a prepreg sheet (a fiber reinforced resin material) made of carbon fibers or glass fibers impregnated with a synthetic resin and rolled, so as to have a uniform specific gravity across its entire length; therefore, the vibration caused by a fish bite does not persist long. That is, when a casting rod is manually held for fishing, a fish bite can be sensed by sensing the vibration of the tip rod at the butt end; but since the vibration does not persist long, an angler may overlook a fish bite in a fishing style of keeping a casting rod on a rod holder and watching the tip rod. Also, upon a slight fish bite, the angler may not satisfactorily sense the vibration at the butt end and may overlook the fish bite.

SUMMARY

The present invention is intended to overcome the above problem. One object of the present invention is to provide a casting rod in which vibration of a tip rod caused by a fish bite persists long. Another object of the present invention is to provide a method of simply fabricating such a tip rod.

To the above end, the casting rod of the present invention includes a tip rod formed of a fiber reinforced resin material into a tubular shape; and a distal end region of the tip rod is provided with a high specific gravity member having a specific gravity three to six times as high as that of a material constituting the tip rod.

When the above casting rod is kept on a rod holder (such that the tip rod is almost in an upright position), the tip rod vibrates due to vibration caused by a fish bite. The distal end region of the tip rod, which includes a member having a higher specific gravity than a material constituting the tip rod (a high specific gravity member), has a low vibration damping factor as compared to conventional tip rods, and its vibration caused by a fish bite persists for a while. That is, since the vibration caused by a fish bite persists for a while, an angler who sometimes looks away from the tip rod may probably visually sense the fish bite. When the casting rod is manually held, vibration caused by a slight fish bite which persists for a while can be sensed at the butt end. Thus, a slight fish bite is less likely to be overlooked.

The present invention provides a method of fabricating the tip rod of the casting rod configured as described above. The method comprises the steps of: fitting a metal tube around a small diameter portion at a distal end of a mandrel having a circular section; rolling, on a mandrel having the tube fitted therearound, a plurality of prepreg sheets having a lower specific gravity than the tube; and heating the mandrel having the prepreg sheets rolled thereon to harden a synthetic resin in the prepreg sheets and then pulling out the mandrel.

The tip rod of the present invention can be fabricated in accordance with a conventional method, by rolling a prepreg sheet on a mandrel, thermally hardening the prepreg sheet, and pulling out the mandrel. In the present invention implementing such a fabrication method, a small diameter portion is formed in a distal end of the mandrel, and a metal tube having a higher specific gravity than the prepreg sheet is fitted around the small diameter portion; then, the prepreg sheet is rolled thereon as is on the mandrel. In such a fabrication method, after pulling out the mandrel, a tubular tip rod has a high specific gravity tube attached on its inner circumferential surface of the distal end, thus making it possible to simply fabricating a tip rod including a high specific gravity member in the distal end region as described above.

The present invention provides a casting rod wherein, upon a fish bite, vibration of a tip rod persists long and the fish bite is less likely to be overlooked.

BRIEF DESCRIPTION OF THE DRAWINGS

FIG. **4*a* explains a method of fabricating the tip rod.

DESCRIPTION OF EXAMPLE EMBODIMENTS

Figure 1:
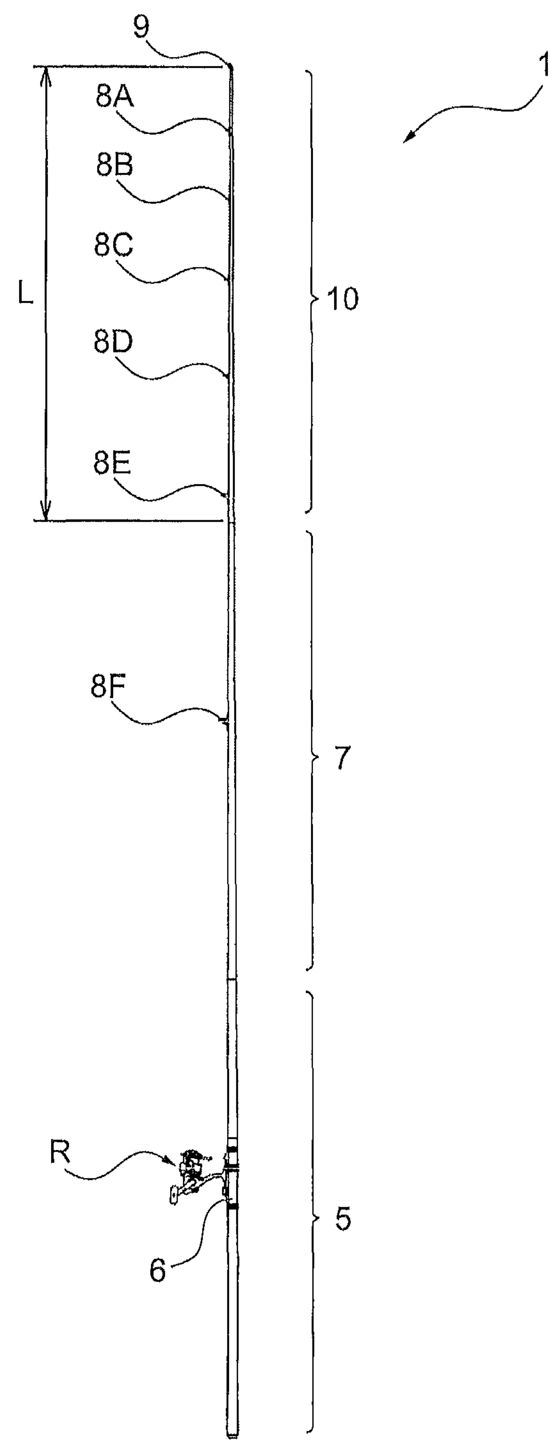
FIG. 1 shows an embodiment of a casting rod according to an embodiment of the present invention.
Figure 2:
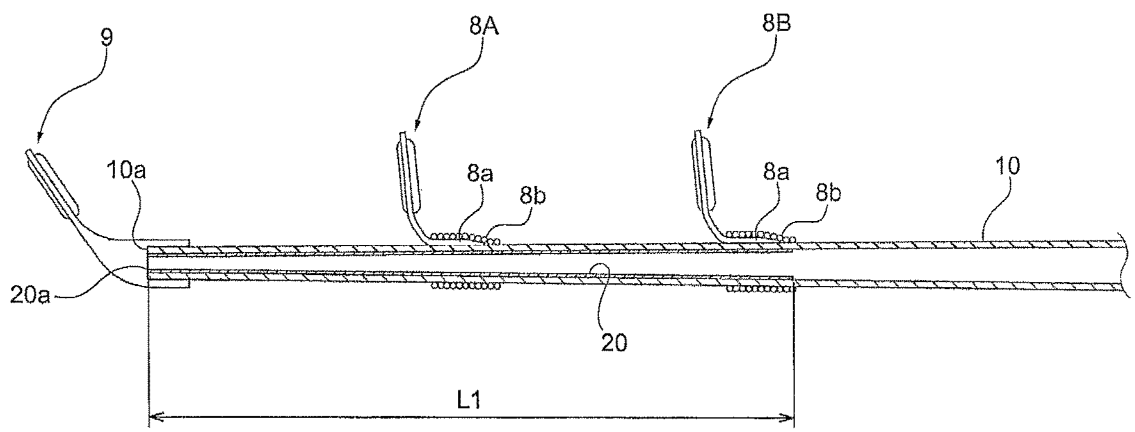
FIG. 2 shows a tip rod of the casting rod shown in FIG. 1.
Figure 3:
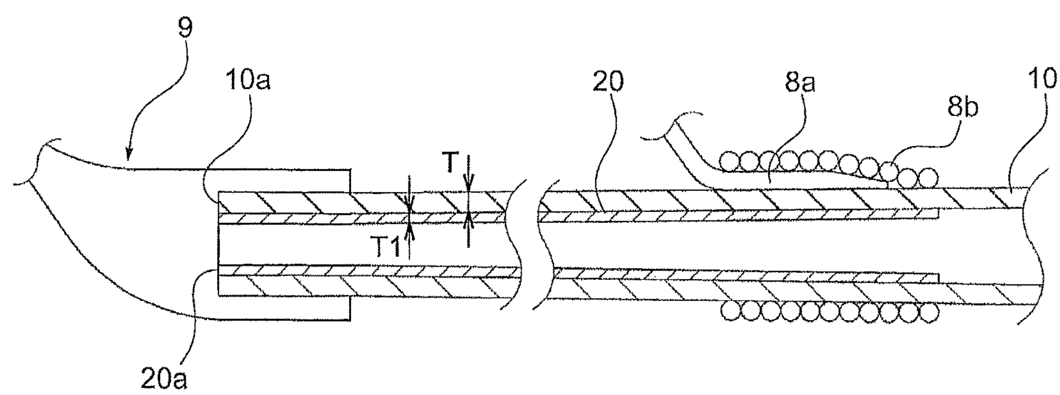
FIG. 3 is an enlarged view of a main part of the tip rod.

Casting rods according to the invention are hereinafter described with reference to the drawings. FIGS. 1 to 3 show an embodiment of the casting rod of the present invention, wherein FIG. 1 shows the entire configuration, FIG. 2 shows the tip rod, and FIG. 3 is an enlarged view of a main part of the tip rod.

The casting rod 1 may include a plurality of rods jointed together. In the embodiment, the casting rod 1 may include a base rod 5, an intermediate rod 7, and a tip rod 10; and these three rods may be ordinarily jointed together. The casting rod 1 may either include no intermediate rod 7 or include two or more intermediate rods jointed together. Further, the rods may be telescopic, instead of being ordinarily jointed.

The base rod 5 may be provided with a reel seat 6 for fixing a fishing reel R. The tip rod 10 and the intermediate rod 7 may be provided with a plurality of line guides 8A to 8F for guiding a fishing line released from the fishing reel R; and a top guide 9 may be fitted and fixed on the distal end of the tip rod 10. The line guides may be fixed at respective positions on the rods by winding a fixing thread 8*b* on respective fixing legs 8*a* (see FIGS. 2 and 3). The arrangement of the line guides shown is an example, and a desired number of line guides may be disposed on the rods. Therefore, the base rod 5 may also be provided with line guides.

The base rod 5 and the intermediate rod 7 may be formed of a tube made of a fiber reinforced resin. More specifically, these rods may be formed in accordance with a conventional method, by rolling on a core bar a fiber reinforced resin prepreg (a prepreg sheet) including reinforcement fibers (such as carbon fibers and glass fibers) impregnated with a synthetic resin such as an epoxy resin, heating the prepreg sheet, and pulling out the core bar.

The tip rod 10 may also be formed of a rolled prepreg sheet, as may be the base rod and the intermediate rod. The configuration of the tip rod 10 will be hereinafter described with reference to FIGS. 2 and 3.

The tip rod 10 may be entirely formed in a tubular shape by rolling a prepreg sheet (a fiber reinforced resin material). As publicly known, the prepreg sheet rolled may include a body prepreg sheet which is continuous over the entire length so as to form the tip rod, and a reinforcement prepreg sheet reinforcing the body layer formed of the body prepreg sheet.

The body prepreg sheet may be variously configured with reinforcement fibers extending in, e.g., the lengthwise direction, the circumferential direction, or in a slanted direction or with reinforcement fibers woven; and the reinforcement prepreg sheet may also be variously configured as is the body prepreg sheet. These prepreg sheets may be rolled on a mandrel one over another or rolled individually, and may be configured as desired (in the number of times of rolling, the direction and the type of the reinforcement fibers, the amount of resin included, the thickness, etc.) in accordance with, e.g., the load of a weight applicable to the casting rod.

In the distal end region of the tip rod 10 may be disposed a large weight body (a high specific gravity member) 20 formed of a material having a higher specific gravity than a material constituting the tip rod. The high specific gravity member 20 may be formed of a metal material such as nickel, titanium, a nickel-titanium alloy, or stainless steel (SUS). In the embodiment, the high specific gravity member 20 may be formed in a tubular shape and disposed on an inner circumferential surface of the tip rod 10.

The high specific gravity member 20 should have an effect of lowering the vibration damping factor of the tip rod (causing the tip rod to vibrate for a long time) when the tip rod of a casting rod kept on a rod holder (in a standing position) is vibrated due to a fish bite. Accordingly, the high specific gravity member 20 may be formed of a material heavier than a material of the tip rod and may be disposed on the distal end region of the tip rod to lower the vibration damping factor of the tip rod; but if the high specific gravity member 20 is heavier than necessary or disposed so as to be concentrated at one location in the distal end region, the tip portion may swing violently upon casting of the tackle for a long distance, thus causing the problems of worse operability, shorter casting distance, and breakage of the tip rod. Conversely, if the high specific gravity member is too light, the vibration damping factor of the tip rod cannot be low.

Accordingly, the high specific gravity member 20 may have a specific gravity three to six times as high as a material constituting the tip rod 10. For example, if the tip rod 10 is formed of a fiber reinforced resin material (a prepreg sheet) including reinforcement fibers composed mainly of carbon fibers, its specific gravity may be 1.5 to 1.8; and a nickel-titanium alloy having a specific gravity of 6.45 may be used with respect to such a tip rod so as to lower the vibration damping factor of the tip rod while maintaining its operability.

The high specific gravity member 20 should be disposed within the distal end region of the tip rod. More preferably, the high specific gravity member 20 should extend over a certain length from the distal end edge 10*a* of the tip rod 10 toward the proximal end for ease of vibration. Further, if the length L1 is too large, the vibration damping factor cannot be effectively lowered; and if the length L1 is too small, the operability in casting a tackle may be reduced. Thus, the length L1 should preferably be 5 to 25% of the entire length L of the tip rod. It may be preferably that the length L1 should be smaller as the specific gravity of the high specific gravity member 20 is lower, and the length L1 should be larger as the specific gravity of the same is higher. The rear end of the high specific gravity member 20 should preferably be at the position where a line guide (the second line guide 8B in FIG. 2) may be fixed. Since line guides may have fixing legs 8*a* thereof fixed on the surface of the rods with a fixing thread 8*b* wound thereon, such a portion of the rod may have a slightly higher rigidity and may be less prone to bending. A region where a line guide is fixed (a region where a thread is wound) may be provided on the rear end of the high specific gravity member 20 such that, when the tip rod is largely bent in actual fishing, the high specific gravity member 20 can be prevented from being removed from the fiber reinforced resin layer.

The high specific gravity member 20 of the present invention may be formed as a tube made of a nickel-titanium alloy and may be attached to the inner circumferential surface of the distal end region of the tip rod 10 with its distal end edge 20*a* aligned with the distal end edge 10*a* of the tip rod 10. The axial length of the high specific gravity member 20 should be 5 to 25% of the entire length L of the tip rod, as described above. Further, as will be described later, the high specific gravity member 20 constituted by a tube can be integrated (formed integrally) with the tip rod in the process of fabricating the tip rod. Though such integration, the high specific gravity member 20 can be readily disposed in position.

If the thickness of the high specific gravity member 20 is large, the tip rod may be hardened (and have a higher bending rigidity) to lower the casting performance. The high specific gravity member 20 should preferably have as small a thickness as possible. More specifically, the thickness T1 of the high specific gravity member 20 should preferably be double the thickness T of the tip rod 10 or smaller than 2T. The bending rigidity should preferably be at such a degree that the high specific gravity member 20 does not impact the intrinsic bending rigidity of the tip rod 10, that is, three or more times as high as the rigidity of the tip rod 10.

Next, the method of fabricating the tip rod will be described with reference to FIGS. 4*a* and 4*b*. The tip rod 10 described above can be fabricated in accordance with a conventional method, by rolling a prepreg sheet on a mandrel 50, thermally hardening the prepreg sheet, and pulling out the mandrel. In the present invention implementing such a fabrication method, a small diameter portion 51 may be formed in a distal end of the mandrel 50, and a metal tube (a high specific gravity member 20) having a higher specific gravity than the prepreg sheet 15 forming a tip rod 10 may be fitted around the small diameter portion; then, the prepreg sheet 15 having a lower specific gravity than the tube may be rolled thereon. The metal tube may be fitted around the small diameter portion 51 such that the outer circumferential surface is flush with the outer circumferential surface of the mandrel 50. Accordingly, the fiber reinforced resin layer can be formed stably without bending of the reinforcement fibers in rolling on the outer circumference the prepreg sheet wherein the reinforcement fibers are arranged in the axial direction (concentration of stress can be prevented).

As described above, the prepreg sheet 15 may include a body prepreg sheet constituting the body layer forming the entire length of the tip rod and a reinforcement prepreg sheet constituting a reinforcement layer for reinforcing relevant portions. These prepreg sheets may be rolled on the mandrel 50 around which the tube (the high specific gravity member 20) is fitted (see FIG. 4*b*). The mandrel 50 on which the prepreg sheet 15 is rolled may be heated to harden the synthetic resin included in the prepreg sheet 15, and the mandrel 50 may be pulled out to complete the tip rod having the tube-like high specific gravity member 20 attached on the inner circumferential surface of the distal end region.

Figure 4A:
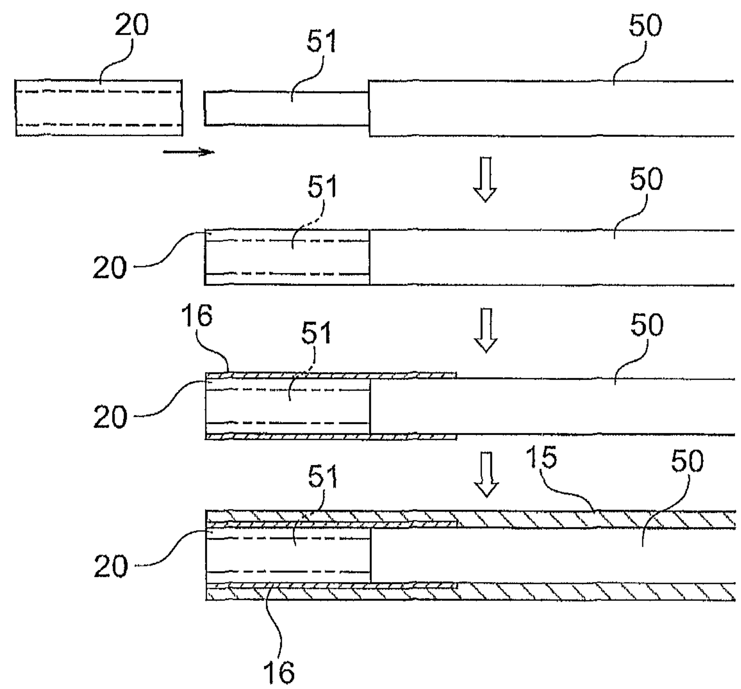
FIG. 4*b*** explains another method of fabricating the tip rod.
Figure 4B:
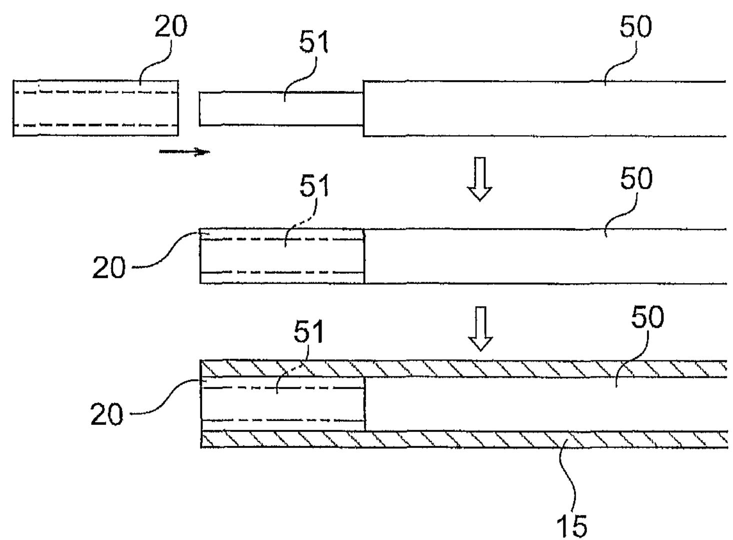

In the above fabrication process, it is preferable that, after the tube (the high specific gravity member 20) is fitted around the small diameter portion 51 of the mandrel 50, a prepreg sheet 16 (with a specific gravity of 2.54) having a member such as glass fibers for enhancing the adhesion to the prepreg sheet 15 should be rolled on the surface of the tube and thermally hardened (see FIG. 4*a*). The prepreg sheet 16 rolled on the tube may facilitate rolling of the prepreg sheet 15; and after the prepreg sheet 15 is rolled, heating may enhance the adhesion between the tube-like high specific gravity member 20 and the prepreg sheet 15 (the inner circumferential surface of the tip rod) to stabilize the performance of the tip rod.

In such a fabrication method of the tip rod 10, after pulling out the mandrel, a tubular tip rod 10 has a high specific gravity tube attached on its inner circumferential surface of the distal end region, thus making it possible to simply fabricating a tip rod 10 including a high specific gravity member 20 in the distal end region.

In the casting rod 1 including the tip rod 10 described above, the vibration damping factor of the tip rod 10 is low; therefore, when there is a fish bite on the casting rod kept in the standing position, the vibration may be retained for a long period of time. Accordingly, in the fishing method of visually sensing a fish bite through the tip rod and wind up a tackle, there is less possibility of overlooking a fish bite and missing a catch. Further, since the high specific gravity member shaped in a tube having a small thickness is attached to the inner circumferential surface of the distal end region of the tip rod 10, the tip rod can be prevented from swinging violently in casting a tackle, and thus there is no impact on the casting performance. Additionally, when there is a fish bite while the base rod is manually held, a slight fish bite can be readily sensed even under a condition of strong wind since the tip rod vibrates for a long period of time.

Figure 5:
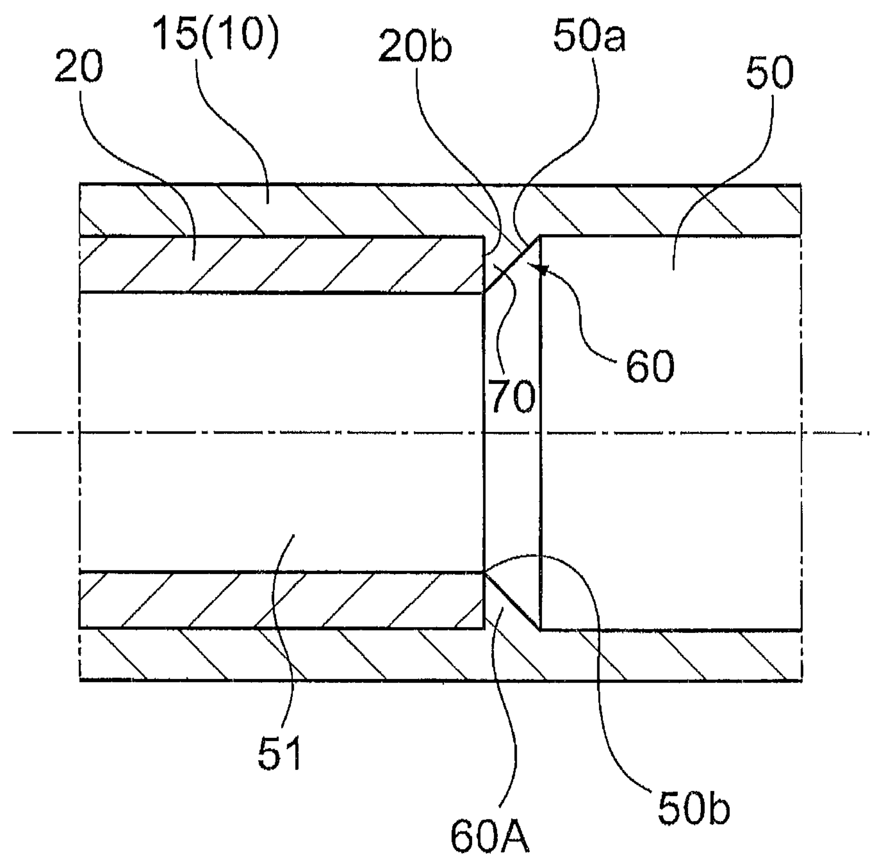
FIG. 5 is an enlarged sectional view showing a main part of a first exemplary variation of the tip rod shown in FIGS. 2 and 3 along with a mandrel.

FIG. 5 shows a main part of a first exemplary variation of the above tip rod 10 along with a mandrel 50 for fabrication. In the first exemplary variation as shown, a tube (a high specific gravity member) 20 may be disposed on the inner circumferential surface of the tip rod 10; and a movement restricting portion 70 for restricting axial movement of the tube 20 may be provided on the inner circumferential surface of the tip rod 10 so as to abut the rear end 20*b* of the tube 20.

As described with reference to FIGS. 4*a* and 4*b*, the tip rod 10 may be formed by fitting a metal tube 20 (a high specific gravity member 20) around a small diameter portion 51 in the distal end region of the mandrel 50, rolling a prepreg sheet 15 on the mandrel 50, heating the mandrel, and pulling out the mandrel. The movement restricting portion 70 can be readily formed in the above fabrication process if the shape of the mandrel 50 is suitably modified.

More specifically, the outer circumferential surface of the mandrel 50 may include a transition portion 60 adjacent to the small diameter portion 51. The transition portion 60 may be tapered toward the distal end, and the surface of the transition portion 60 may constitute a tapered surface 50*a* in a tapered shape. When the tube 20 is fitted around the small diameter portion 51 of the mandrel 50, the tube 20 may abut an initial rising portion 50*b* of the tapered surface 50*a* and may be positioned thereon, defining a gap 60A having a substantially triangular section. Accordingly, as described above, in heating of the mandrel 50 having the prepreg sheet 15 rolled thereon, the synthetic resin in the prepreg sheet 15 may flow into the a region (the gap 60A) of the transition portion 60 in a tapered shape, and this synthetic resin may cure, whereby the movement restricting portion 70 for restricting axial movement of the tube 20 may be formed on the inner circumferential surface of the tip rod 10 so as to abut the rear end 20*b* of the tube 20.

The movement restricting portion 70 may restrict axial movement of the tube 20 and thus inhibit spalling of the tube 20 from the prepreg sheet 15; and even upon spalling of the tube 20, the movement restricting portion 70 may prevent the separation of the tube 20 from the tip rod 10. That is, axial movement of the tube 20 may be restricted by a top guide 9 fitted and fixed on the distal end of the tip rod (see FIG. 2) and the movement restricting portion 70; therefore, even the tube 20 spalled may not be separated from the tip rod 10. The movement restriction portion 70 may seal the interface (contacting surface) between the tube 20 and the prepreg sheet 15 and thus prevent water from entering between the tube 20 and the prepreg sheet 15, which may effectively prevent spalling of the tube 20 from the prepreg sheet 15 due to the water.

Figure 6:
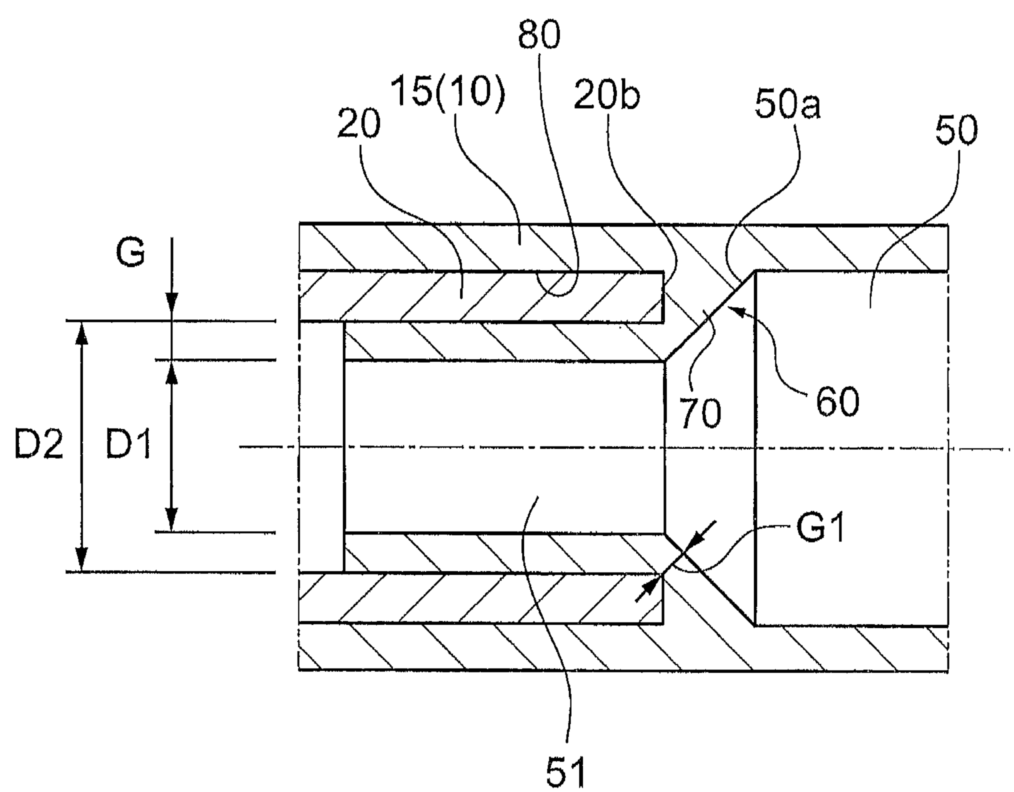
FIG. 6 is an enlarged sectional view showing a main part of a second exemplary variation of the tip rod shown in FIGS. 2 and 3 along with a mandrel.

FIG. 6 shows a main part of a second exemplary variation of the above tip rod 10 along with a mandrel 50 for fabrication. In the second exemplary variation as shown, an annular recess 80 for internally receiving the rear end portion of the tube 20 may be formed integrally with the movement restricting portion 70 shown in FIG. 5. The annular recess 80 can be formed by making an outer diameter D1 of the small diameter portion 51 of the mandrel 50 slightly smaller than an inner diameter D2 of the tube 20 fitted, in addition to providing a tapered surface 50*a* in the outer circumferential surface of the mandrel 50 as in FIG. 5.

Although FIG. 6 shows a deformed illustration, since the inner diameter D2 of the tube 20 is slightly larger than the outer diameter D1 of the small diameter portion 51, a small gap G may be produced between the inner surface of the tube 20 fitted and the outer surface of the small diameter portion 51; and the edge of the tube 20 may be fitted so as not to abut the tapered surface 50*a* and to produce a small gap (annular gap) G1. Then, the prepreg sheet 15 may be rolled thereon. When the mandrel 50 is heated, the synthetic resin in the prepreg sheet 15 may flow into a region around the transition portion 60; and part of the synthetic resin may flow through the gap G1 into the gap G and cure to integrally form the annular recess 80 internally receiving the rear end portion of the tube 20.

That is, the annular recess 80 which may internally receive the rear end portion of the tube 20 and abut the rear end 20*b* of the tube 20 to restrict axial movement of the tube 20 may be formed in the inner circumferential surface of the tip rod 10, which may strengthen the movement restricting portion 70 so as to surely restrict the axial movement of the tube 20.

Figure 7:
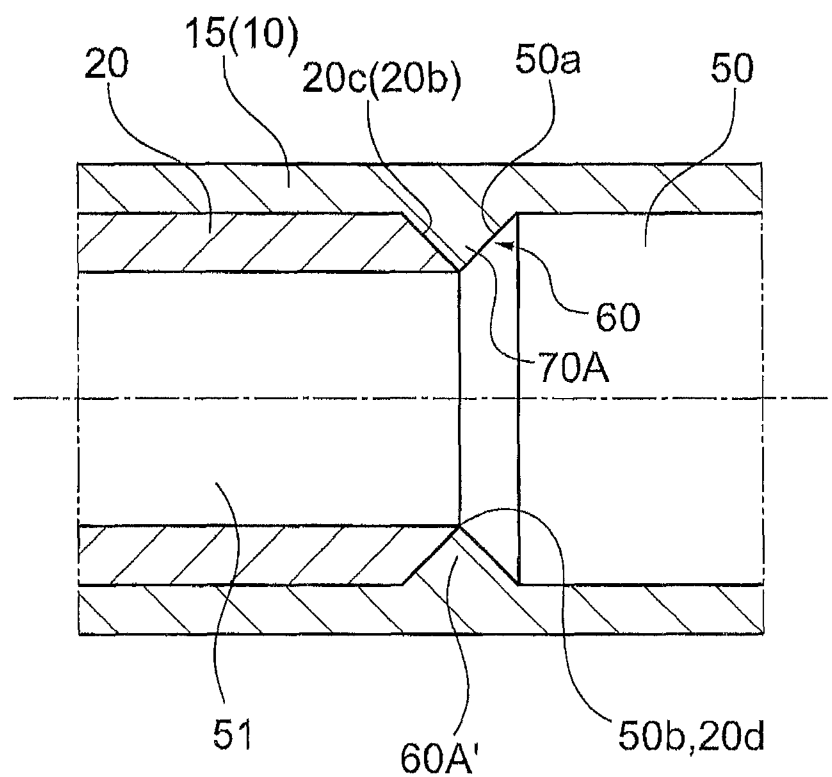
FIG. 7 is an enlarged sectional view showing a main part of a third exemplary variation of the tip rod shown in FIGS. 2 and 3 along with a mandrel.

FIG. 7 shows a main part of a third exemplary variation of the above tip rod 10 along with a mandrel 50 for fabrication. As shown, the third exemplary variation is a further variation of the first exemplary variation shown in FIG. 5, wherein the rear end 20*b* of the tube 20 may be formed to have a tapered surface 20*c*, in addition to the tapered surface 50*a* provided in the outer circumferential surface of the mandrel 50 as in FIG. 5. That is, when the tube 20 is fitted around the small diameter portion 51, the initial rising portion 20*d* of the tapered surface 20*c* may abut the initial rising portion 50*b* of the tapered surface 50*a* to define a gap 60A' having a substantially triangular section. Accordingly, as described above, in heating of the mandrel 50 having the prepreg sheet 15 rolled thereon, the synthetic resin in the prepreg sheet 15 may flow into the gap 60A' between the tapered surface 20*c* and the tapered surface 50*a*, and this synthetic resin may cure, whereby the movement restricting portion 70 may be formed to have a substantially triangular section. The movement restricting portion 70A thus shaped may receive the tube 20 on the tapered surface 20*c* while preventing concentration of the stress, such that the tube 20 is less prone to spall from the inner surface of the prepreg sheet.

Embodiments of the present invention are not limited to the above descriptions and are susceptible to various modifications.

Figure 8:
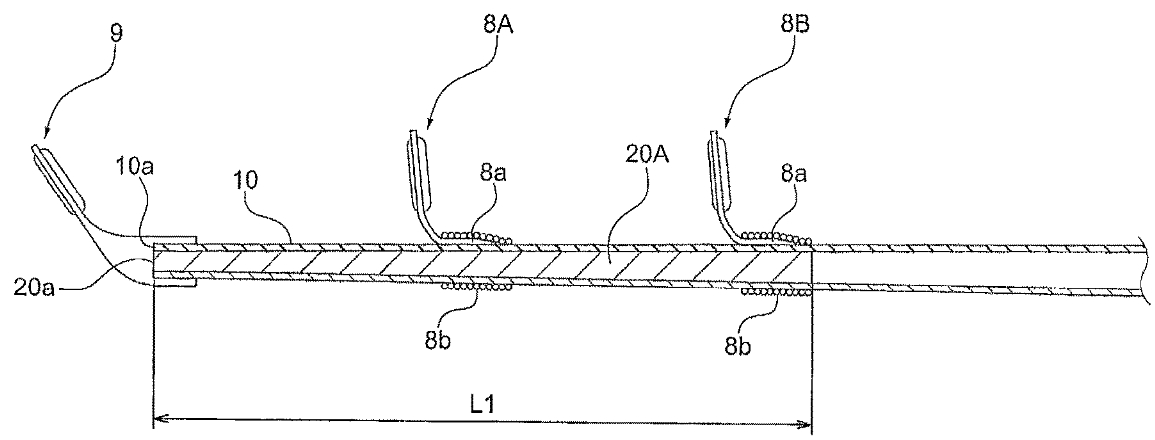
FIG. 8 shows another embodiment of the tip rod.

In the above embodiments, the tube-like high specific gravity member 20 may be disposed integrally and simultaneously with formation of the tip rod; but it is also possible to dispose the high specific gravity member after the tip rod 10 is formed. For example, a high specific gravity member 20A may be separately formed to have a shaped of tapered cylinder conforming to a cavity in the distal end region of the tip rod 10; and the high specific gravity member 20A may be coated with an adhesive on the surface thereof and inserted into the formed tip rod 10 through its rear end opening to be adhered to the inner circumferential surface of the distal end region (see FIG. 8). In such an arrangement, it may be possible that the axial length L1 should be smaller as the specific gravity of the high specific gravity member 20 is higher so as to prevent the distal end of the tip rod from having excessively large weight, and the length L1 should be larger as the specific gravity of the same is lower.

The high specific gravity member should preferably be disposed distally beyond the middle point of the tip rod 10; it is not necessary to align the distal end edge 20*a* of the high specific gravity member 20, 20A with the distal end edge 10*a* of the tip rod 10. Further, the high specific gravity member may also be attached on the outer circumferential surface of the tip rod 10. Still further, the present invention can be applied to various fishing rods for casting a tackle and keeping a fishing line under tension until a fish bite, not only to those for casing a tackle for a long distance.

What is claimed is:

1. A casting rod comprising:

at least a base portion and a tip portion extending along a longitudinal axis, the tip portion comprising a tube formed of a fiber reinforced resin material, the tip portion having a distal end region and having a metal tube attached to its distal end region that extends along the longitudinal axis, the tube of fiber reinforced resin material being provided as an outer layer around the metal tube such that the metal tube is disposed on an inner circumferential surface of the outer layer, and wherein the outer layer comprises a movement restricting projection formed uniformly therewith, wherein the projection extends from the inner circumferential surface of the outer layer and projects inwardly towards a center of the tube such that the projection abuts a rear end surface of the metal tube to restrict axial movement of the metal tube along the longitudinal axis, wherein the metal tube is formed of a material having a specific gravity three to six times higher than a specific gravity of the fiber reinforced resin material constituting the tip portion.

2. The casting rod of claim 1, wherein the length of the metal tube is 5 to 25% of the entire length of the tip portion.

3. The casting rod of claim 2, wherein the thickness of the metal tube is double the thickness of the tip portion or smaller.

4. The casting rod of claim 1, wherein the movement restricting projection is formed with an annular recess internally receiving a rear end portion of the tube.

5. The casting rod of claim 1, wherein the rear end surface of the metal tube is tapered, and the movement restricting projection receives the tapered rear end surface on a surface thereof.

6. The casting rod of claim 1, wherein the movement restricting projection is formed of the fiber reinforced resin material of the tip portion and formed integrally therewith.

7. The casting rod of claim 1, wherein the metal tube comprises a distal end edge that is opposite to the rear end surface of the metal tube, wherein the tip portion also comprises an end edge that is distal to the movement restricting projection, and wherein the distal end edge of the metal tube is aligned with the end edge of the tip portion.

8. The casting rod of claim 1, wherein an outer circumferential surface of the metal tube is directly disposed on the inner circumferential surface of the tubular shape of the tip portion.

9. The casting rod of claim 1, further comprising:

a fishing reel fixed to the base portion, and a first line guide for guiding a fishing line released from the fishing reel that is fitted and fixed on the distal end region of the tip portion, wherein both the movement restricting projection and the first line guide are configured to restrict axial movement of the metal tube along the longitudinal axis.

10. The casting rod of claim 9, further comprising a second line guide for guiding the fishing line released from the fishing reel, the second line guide being fixed to the tip portion at a position that is spaced from the first line guide, and wherein the rear end surface of the metal tube is substantially aligned with a position at which the second line guide is fixed.

11. The casting rod of claim 10, wherein the metal tube comprises a distal end edge that is opposite to the rear end surface of the metal tube, wherein the tip portion also comprises an end edge that is distal to the movement restricting projection, and wherein the distal end edge of the metal tube is aligned with the end edge of the tip portion.

12. The casting rod of claim 11, wherein the length of the metal tube is 5 to 25% of the entire length of the tip portion.

13. The casting rod of claim 1, wherein the movement restricting projection comprises a portion of tapered shape.

14. The casting rod of claim 1, wherein the movement restricting projection comprises a distal end facing surface configured to abut the rear end surface of the metal tube.

15. The casting rod of claim 1, wherein the movement restricting projection extends from the inner circumferential surface of the tubular shape of the tip portion.

* * * * *